(12) United States Patent
Jin

(10) Patent No.: US 9,990,082 B2
(45) Date of Patent: Jun. 5, 2018

(54) TOUCH-CONTROL DISPLAY PANEL

(71) Applicants: Shanghai AVIC OPTO Electronics Co., Ltd., Shanghai (CN); Tianma Micro-electronics Co., Ltd., Shenzhen (CN)

(72) Inventor: Huijun Jin, Shanghai (CN)

(73) Assignees: SHANGHAI AVIC OPTO ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days. days.

(21) Appl. No.: 15/162,943

(22) Filed: May 24, 2016

(65) Prior Publication Data

US 2017/0228081 A1    Aug. 10, 2017

(30) Foreign Application Priority Data

Feb. 6, 2016    (CN) .......................... 2016 1 0084164

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01)

(58) Field of Classification Search
CPC ......... G06F 3/0416; G06F 3/044; G06F 3/042
See application file for complete search history.

(56) References Cited

U.S. PATENT DOCUMENTS

| 2014/0055685 A1* | 2/2014 | Wang | G06F 3/0412 349/12 |
| 2016/0282689 A1* | 9/2016 | Zhang | G09G 3/3655 |
| 2016/0378254 A1* | 12/2016 | Wang | G06F 3/044 345/174 |

(Continued)

FOREIGN PATENT DOCUMENTS

| CN | 102841716 A | 12/2012 |
| CN | 103676360 A | 3/2014 |
| CN | 104516141 A | 4/2015 |

(Continued)

*Primary Examiner* — Amr Awad
*Assistant Examiner* — Andre Matthews
(74) *Attorney, Agent, or Firm* — Anova Law Group, PLLC

(57) ABSTRACT

A touch-control display panel includes a common electrode layer, a display electrode layer, and a driving circuit. The common electrode layer include a plurality of stripe-shaped electrodes disposed in parallel in a first direction, with at least one of the plurality of stripe-shaped electrodes including at least two stripe-shaped sub-electrodes arranged in parallel in the first direction. The display electrode layer is disposed opposite to the common electrode layer, and the driving circuit is configured for driving the plurality of stripe-shaped electrodes. In a display stage, the plurality of stripe-shaped electrodes operate as common electrodes, and the driving circuit provides common voltage signals to the stripe-shaped electrodes. In a touch-control stage, the plurality of stripe-shaped electrodes operate as touch-control electrodes, and the driving circuit provides touch-control driving signals to the stripe-shaped electrodes.

12 Claims, 12 Drawing Sheets

(56) References Cited

U.S. PATENT DOCUMENTS

2017/0177137 A1* 6/2017 Bell .................. G06F 3/0416

FOREIGN PATENT DOCUMENTS

| CN | 104536637 A | 4/2015 |
| CN | 102841716 B | 8/2015 |
| CN | 205563509 U | 9/2016 |
| TW | M500303 U | 5/2015 |

* cited by examiner

US 9,990,082 B2

TOUCH-CONTROL DISPLAY PANEL

CROSS-REFERENCES TO RELATED APPLICATIONS

This application claims priority of Chinese Patent Application No. 201610084164.6, filed on Feb. 6, 2016, the entire contents of which are hereby incorporated by reference.

FIELD OF THE INVENTION

The present disclosure generally relates to the field of display technologies and, more particularly, relates to a touch-control display panel.

BACKGROUND

With the development of display technologies, more and more display panels are integrated with touch-control functions. With existing technologies, a common electrode in a touch-control display panel may be divided into a plurality of stripe-shaped electrodes. By using a time-sharing driving method, the common electrode may be reused or multiplexed as a touch-control electrode. In this way, the thickness of a display panel may be reduced, the production efficiency may be improved, and the production cost may be reduced.

It should be noted that, in such a touch-control display panel, each stripe-shaped electrode is electrically connected to a driving circuit of the touch-control display panel through an electrode lead, for receiving driving signals transmitted from the driving circuit. However, because there often is a slit between adjacent stripe-shaped electrodes, and there are no electrode leads at the slit, the slit may be visible when the touch-control display panel displays images. This visible slit phenomenon may decrease the display quality of a touch-control display panel.

The disclosed methods and structures are directed to solve one or more problems set forth above and other problems in the art.

BRIEF SUMMARY OF THE DISCLOSURE

One aspect of the present disclosure includes a touch-control display panel. The touch-control display panel includes a common electrode layer, a display electrode layer, and a driving circuit. The common electrode layer include a plurality of stripe-shaped electrodes disposed in parallel in a first direction, with at least one of the plurality of stripe-shaped electrodes including at least two stripe-shaped sub-electrodes arranged in parallel in the first direction. The display electrode layer is disposed opposite to the common electrode layer, and the driving circuit is configured for driving the plurality of stripe-shaped electrodes. In a display stage, the plurality of stripe-shaped electrodes operate as common electrodes, and the driving circuit provides common voltage signals to the stripe-shaped electrodes. In a touch-control stage, the plurality of stripe-shaped electrodes operate as touch-control electrodes, and the driving circuit provides touch-control driving signals to the stripe-shaped electrodes.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

To make the objectives, technical solutions and advantages of the present invention more clear and explicit, the present invention is described in further detail with accompanying drawings and embodiments. It should be understood that the specific exemplary embodiments described herein are only for explaining the present invention and are not intended to limit the present invention.

Reference will now be made in detail to exemplary embodiments of the disclosure, which are illustrated in the accompanying drawings. Wherever possible, the same reference numbers will be used throughout the drawings to refer to the same or like parts.

Figure 1:
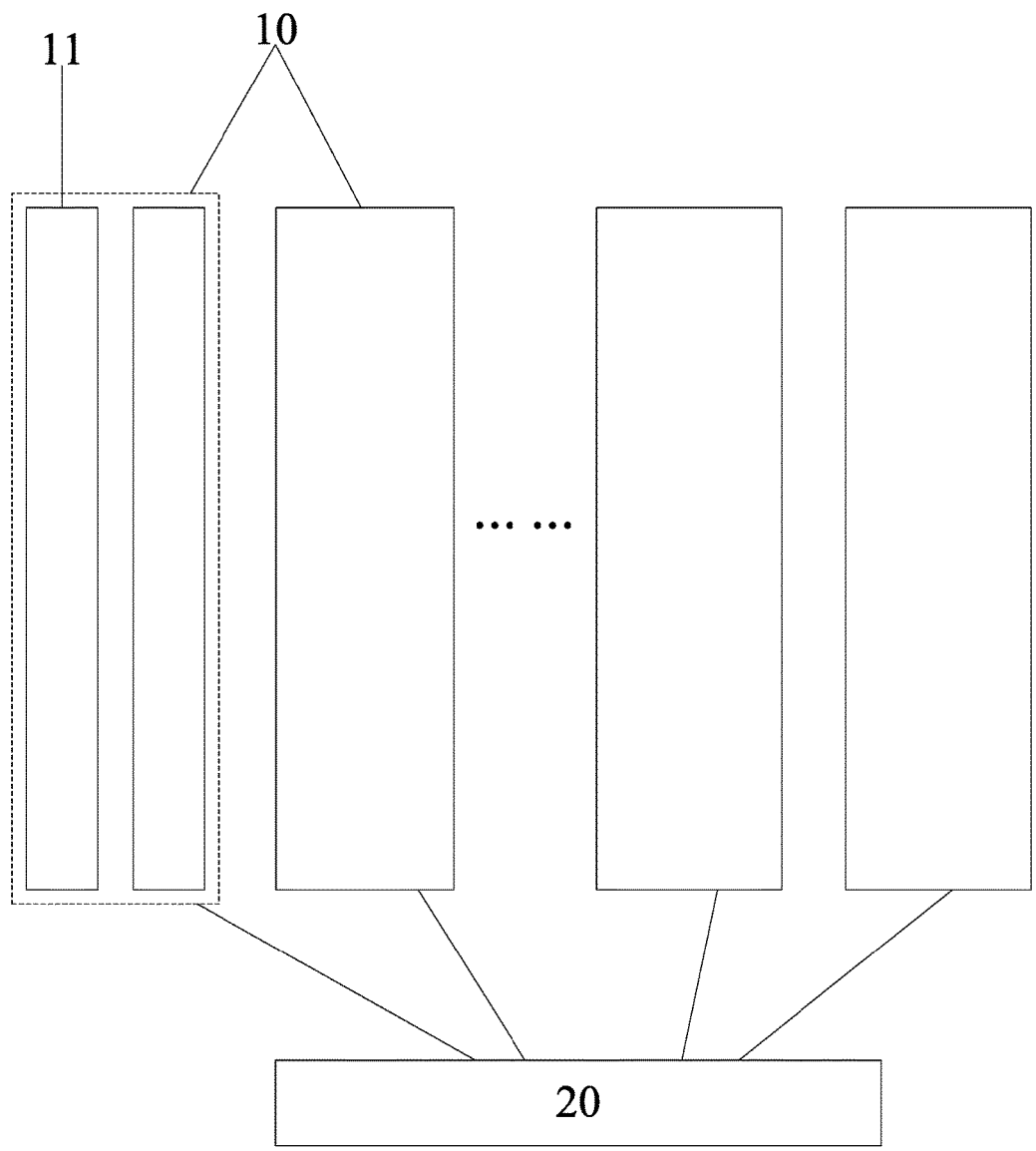
FIG. 1 illustrates a schematic view of an exemplary structure of a common electrode layer and a driving circuit, consistent with the disclosed embodiments.

A touch-control display panel may comprise a display electrode layer and an oppositely disposed common electrode layer, and a driving circuit. FIG. 1 illustrates an exemplary structure of a common electrode layer and a driving circuit.

As shown in FIG. 1, the common electrode layer comprises a plurality of stripe-shaped electrodes 10. The longitudinal direction of the stripe-shaped electrodes 10 refers to a first direction, i.e., the electrodes 10 extends in the first direction. The plurality of stripe-shaped electrodes 10 are disposed in parallel along a second direction, intersecting with the first direction. Thus, there is an angle α between the first direction and the second direction. The value of a may be chosen based on actual applications. In one embodiment, the first direction may be perpendicular to the second direction, and the value of a is approximately 90°.

Further, at least one of the plurality of stripe-shaped electrodes 10 comprises at least two stripe-shaped sub-electrodes 11 arranged in parallel in the first direction. In some embodiments, all or substantially all of the stripe-shaped electrodes 10 include at least two stripe-shaped sub-electrodes 11.

The operation of a touch-control display panel comprises at least a display stage and a touch-control stage. In the display stage, the stripe-shaped electrodes 10 work as common electrodes, and the driving circuit 20 provides common voltage signals to the striped-shape electrodes 10. In the touch-control stage, the stripe-shaped electrodes 10 work as touch-control electrodes, and the drive circuit 20 provides touch-control driving signals to the stripe-shaped electrodes 10.

It should be noted that, in the display stage, the driving circuit 20 provides common voltage signals with a same potential to the plurality of stripe-shaped electrodes 10. In the touch-control stage, the driving circuit 20 individually provides a driving signal to each of the stripe-shaped electrodes 10. The driving circuit 20 concurrently provides touch-control driving signals with a same potential to the stripe-shaped sub-electrodes 11 of a same stripe-shaped electrode 10.

In the disclosed embodiments, at least one of the plurality of stripe-shaped electrodes 10 may include at least two stripe-shaped sub-electrodes 11 arranged in parallel in the first direction. In this way, the slits between the stripe-shaped sub-electrodes 11 and the slits between the stripe-shaped electrodes 10 may be equivalent as to the visible slit phenomenon. Thus, the number of slits in the touch-control display panel is increased, and the visible slit effect due to the presence of slits in the touch-control display panel may be homogenized. Therefore, the visible slit phenomenon of the touch-control display panel may be alleviated, and thus the display quality of the touch-control display panel may be improved.

In some other embodiments, each of the plurality of stripe-shaped electrodes 10 comprises at least two stripe-shaped sub-electrodes 11 arranged in parallel in the first direction. In this way, the number of slits in the touch-control display panel is further increased, and so the visible slit effect due to the presence of slits in the touch-control display panel may be further homogenized. Therefore, the visible slit phenomenon of the touch-control display panel may be further alleviated, and thus the display quality of the touch-control display panel may be further improved.

Figure 2:
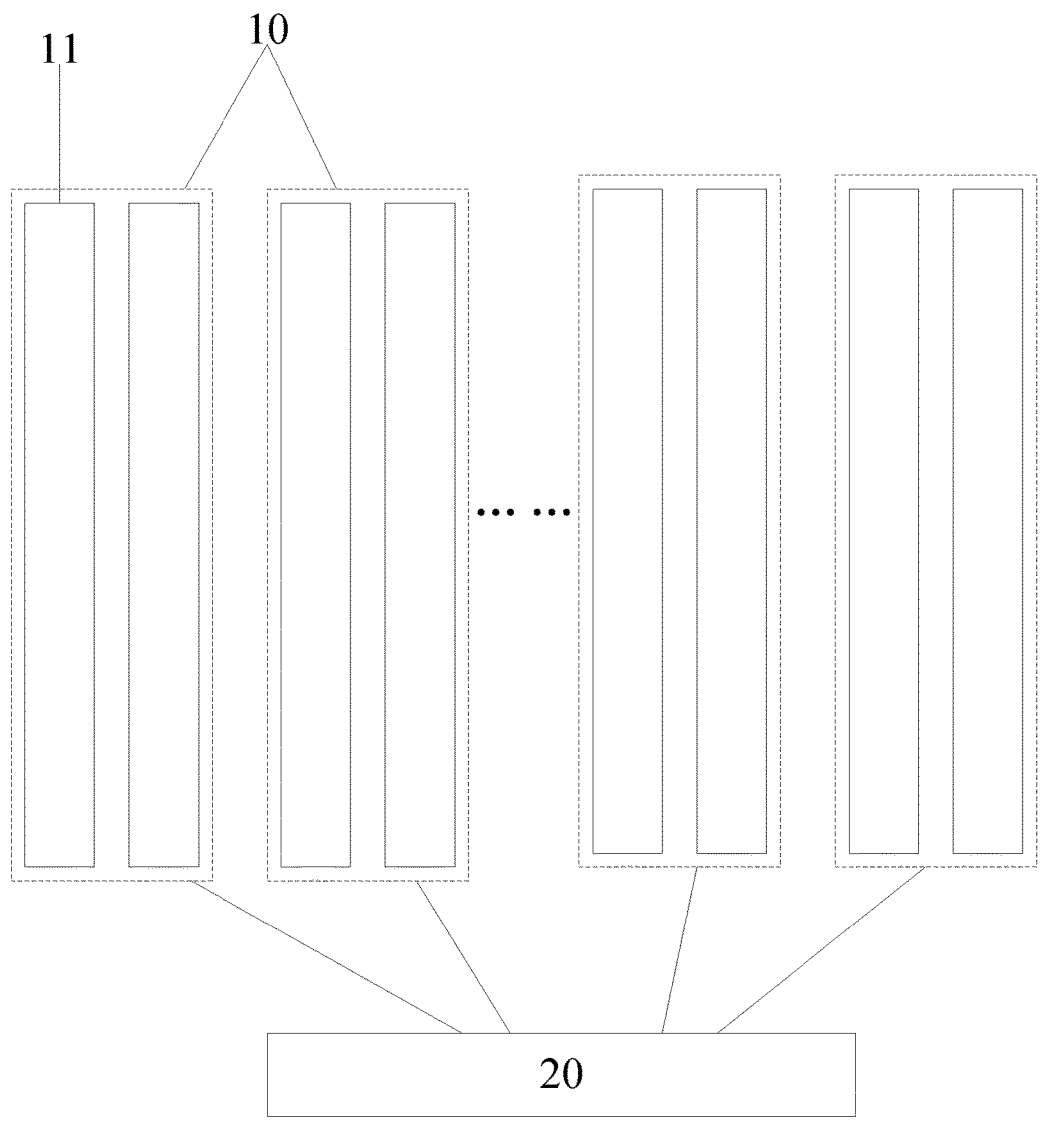
FIG. 2 illustrates a schematic view of another exemplary structure of a common electrode layer and a driving circuit, consistent with the disclosed embodiments.

FIG. 2 illustrates another exemplary structure of a common electrode layer and a driving circuit. As shown in FIG. 2, each of the plurality of stripe-shaped electrodes 10 comprises two stripe-shaped sub-electrodes 11 arranged in parallel in the first direction.

Figure 3:
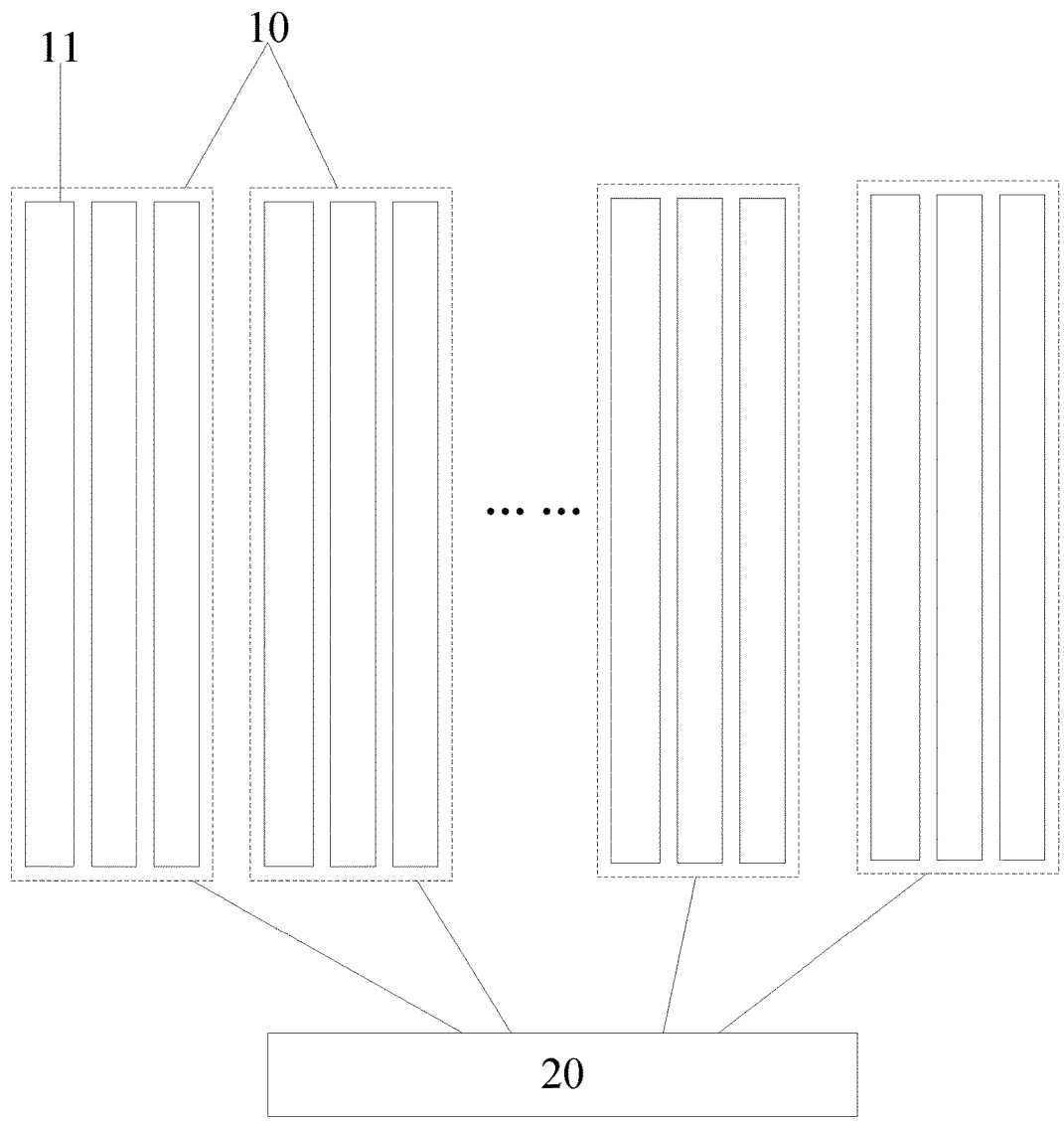
FIG. 3 illustrates a schematic view of another exemplary structure of a common electrode layer and a driving circuit, consistent with the disclosed embodiments.

FIG. 3 illustrates another exemplary structure of a common electrode layer and a driving circuit. As shown in FIG. 3, each of the plurality of stripe-shaped electrodes 10 comprises three stripe-shaped sub-electrodes 11 arranged in parallel in the first direction.

In some other embodiments, each of the plurality of stripe-shaped electrodes 10 may comprises other numbers of stripe-shaped sub-electrodes 11 arranged in parallel in the first direction. The present disclosure does not limit the number of stripe-shaped sub-electrodes 11 of a stripe-shaped electrode 10. The number of stripe-shaped sub-electrodes 11 of an individual stripe-shaped electrode 10 may be determined based on actual applications.

It should be noted that, in a touch-control display panel, if each of the plurality of stripe-shaped electrodes 10 comprises more stripe-shaped sub-electrodes 11, each of the stripe-shaped electrodes 10 has more slits, and the visible slit effect caused by the slits of the touch-control display panel may become more uniform. Therefore, the visible slit phenomenon of the entire touch-control display panel may be more unobvious, and the display quality of the touch-control display panel may be better.

Figure 4:
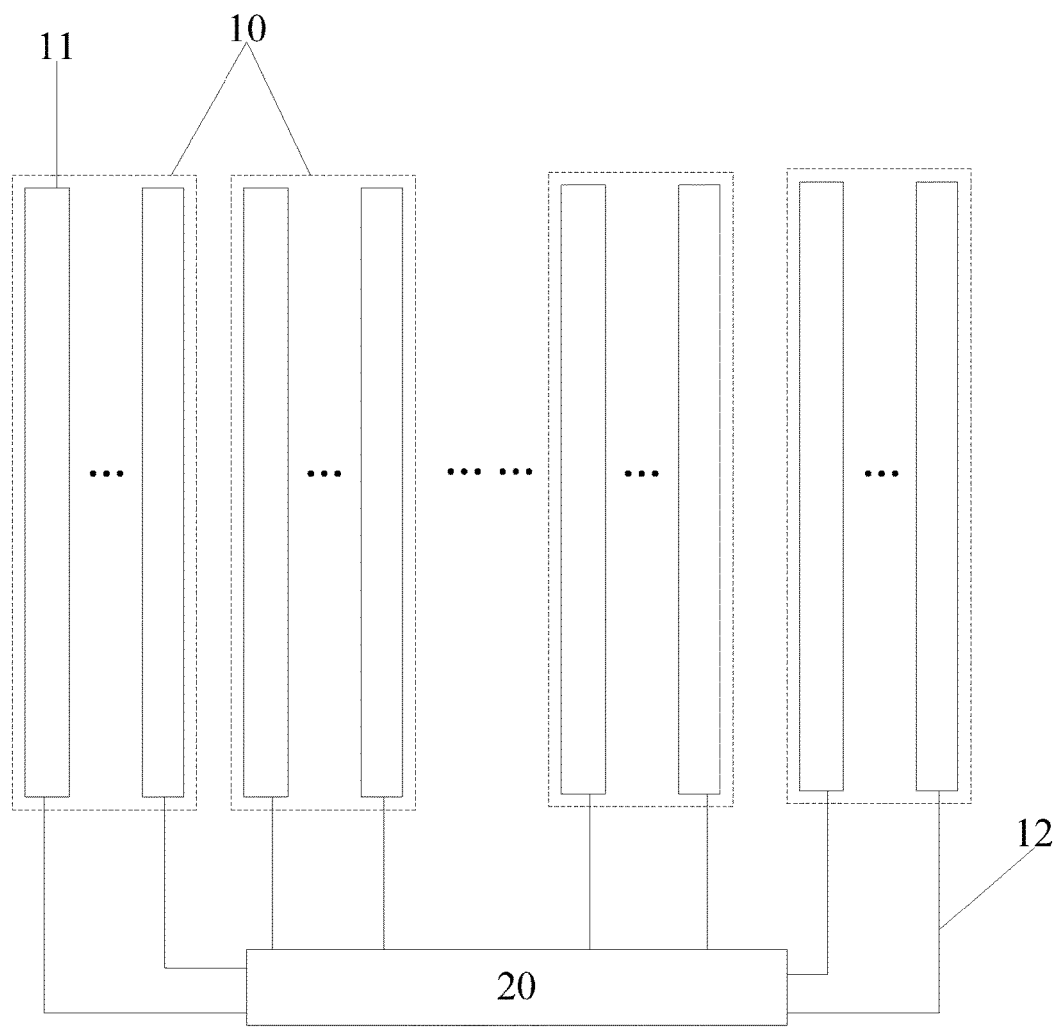
FIG. 4 illustrates a schematic view of another exemplary structure of a common electrode layer and a driving circuit, consistent with the disclosed embodiments.

FIG. 4 illustrates another exemplary structure of a common electrode layer and a driving circuit. As shown in FIG. 4, each stripe-shaped sub-electrode 11 of each stripe-shaped electrode 10 is individually connected to a driving circuit 20 through an electrode lead 12. Further, the driving signals for all the stripe-shaped sub-electrodes 11 of each stripe-shaped electrode 10 are same.

Figure 5:
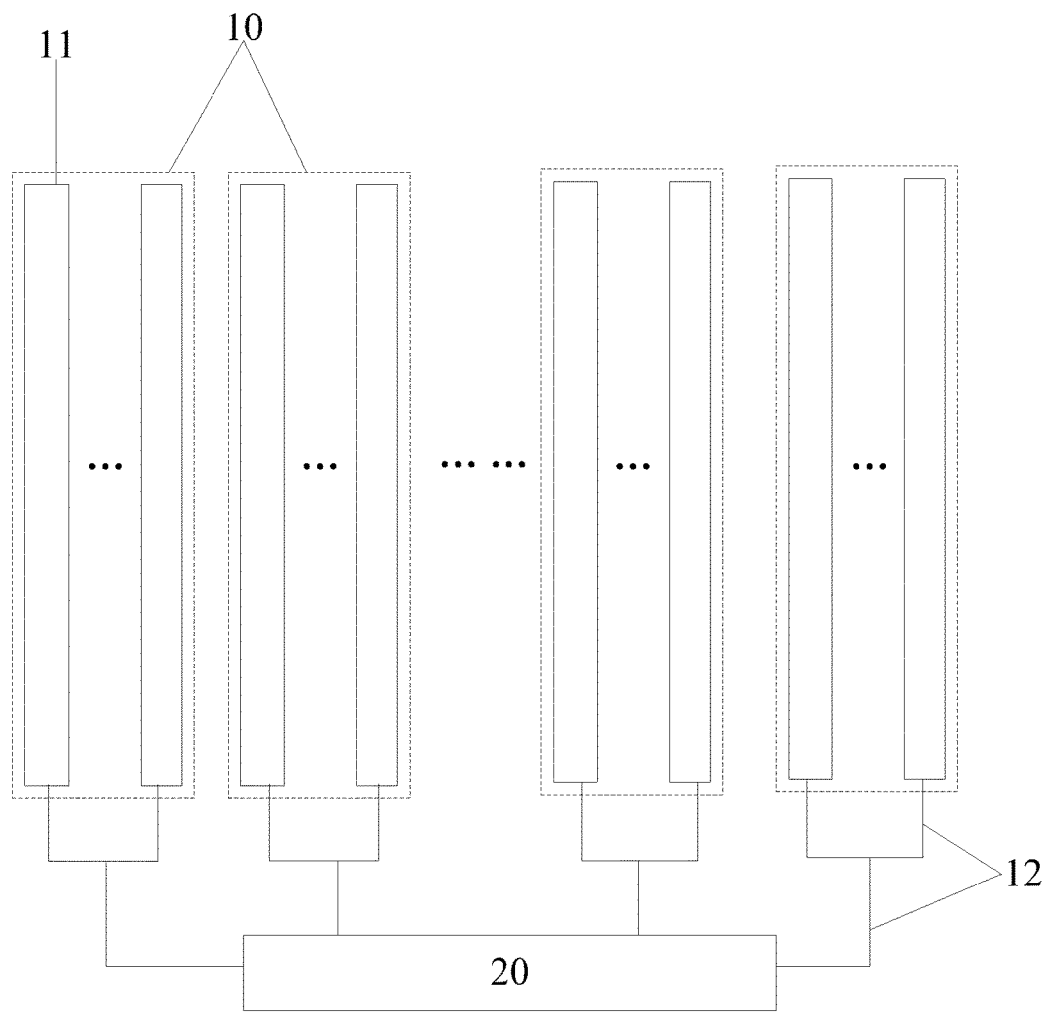
FIG. 5 illustrates a schematic view of another exemplary structure of a common electrode layer and a driving circuit, consistent with the disclosed embodiments.

In another embodiment, for each stripe-shaped electrode 10, all the stripe-shaped sub-electrodes 11 are electrically connected each other, and the stripe-shaped electrode 10 then is electrically connected to a driving circuit 20 through an electrode lead 12. As shown in FIG. 5, for each stripe-shaped electrode 10, all the stripe-shaped sub-electrodes 11 may be electrically connected each other, and then connected to a driving circuit through the electrode lead 12.

In some other embodiments, for each of the stripe-shaped electrodes 10, the stripe-shaped sub-electrodes 11 may be electrically connected through other methods. For example, for each of the stripe-shaped electrodes 10, the stripe-shaped sub-electrodes 11 may be electrically connected directly to each other through portions of the stripe-shaped sub-electrodes 11. Other connection methods may also be used.

Figure 6:
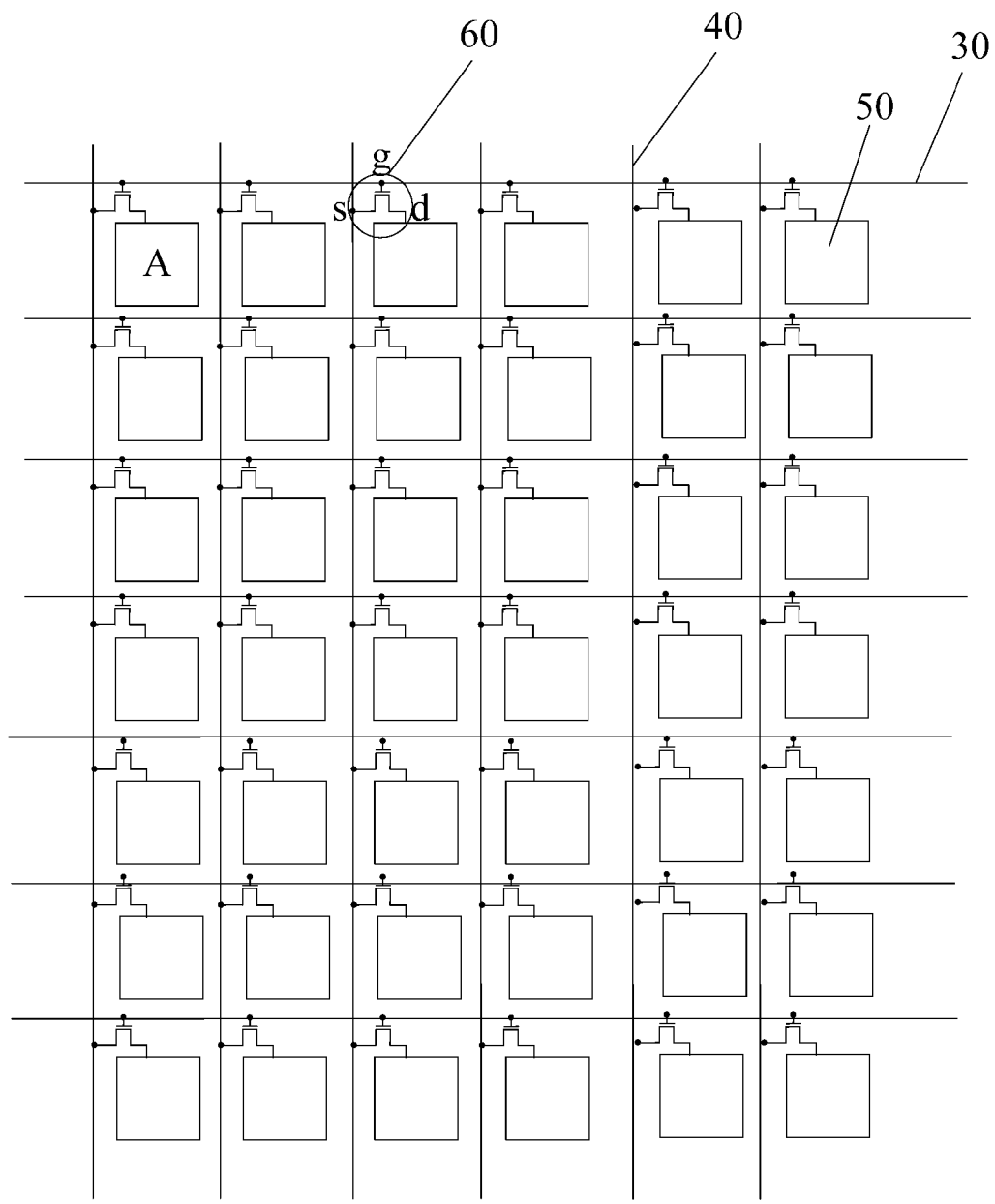
FIG. 6 illustrates a schematic view of an exemplary electrical connection of scanning lines, data lines and sub-pixels, consistent with the disclosed embodiments.

FIG. 6 illustrates an exemplary electrical connection of scanning lines, data lines and sub-pixels. As shown in FIG. 6, a touch-control display panel may further comprise a plurality of scanning lines 30 and a plurality of data lines 40. The scanning lines 30 and the data lines 40 are electrically connected to the display electrode layer. The scanning lines 30 and the data lines 40 may intersect with each other to define a plurality of sub-pixels 50 arranged in a matrix, with a spacing region between two adjacent sub-pixels.

Specifically, the scanning lines 30, the data line 40, and the sub-pixels 50 are electrically connected through thin film transistors 60. Each sub-pixel 50 corresponds to a thin film transistor 60. Each scanning line 30 is electrically connected to the gate electrodes g of a row of thin film transistors 60. Each data line 40 is electrically connected to the source electrodes s of a column of thin film transistor 60. The drain electrode d of each thin film transistor is electrically connected to its corresponding sub-pixel 60.

In an operation process, the scanning lines 30 are electrically connected to each of the sub-pixels 50 through the gate electrode g of the thin film transistor 60, and control the switch of each sub-pixel 50. The data lines 40 are electrically connected to each of the sub-pixels 50 through the source electrode s of the thin film transistor 60. When a thin film transistor 60 corresponding to a sub-pixel 60 is switched on, a corresponding data line 40 provides data signals to the sub-pixel 50, and controls the display of the sub-pixel 50.

Figure 7:
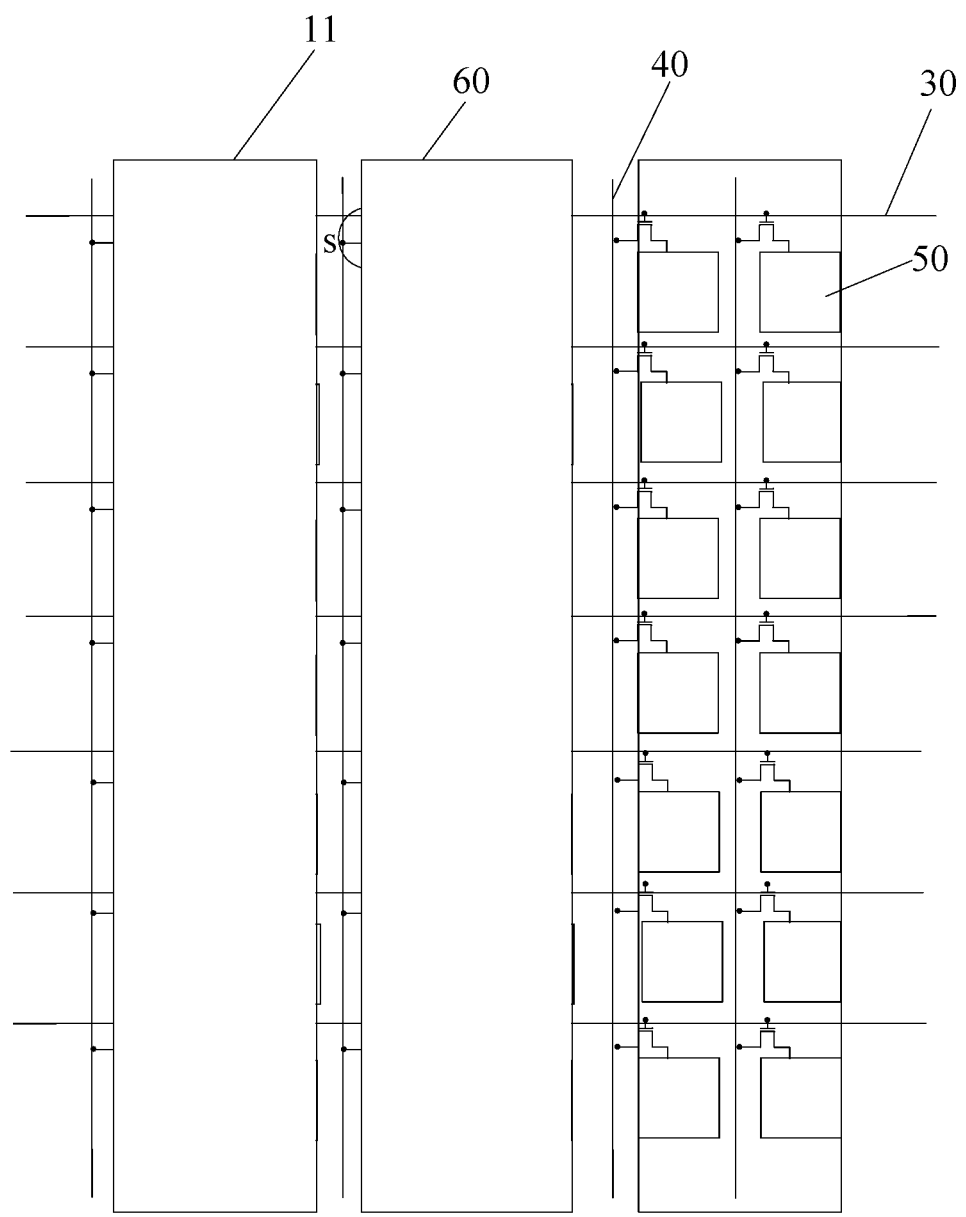
FIG. 7 illustrates a schematic view of an exemplary configuration of stripe-shaped sub-electrodes and sub-pixels, consistent with the disclosed embodiments.
Figure 8:
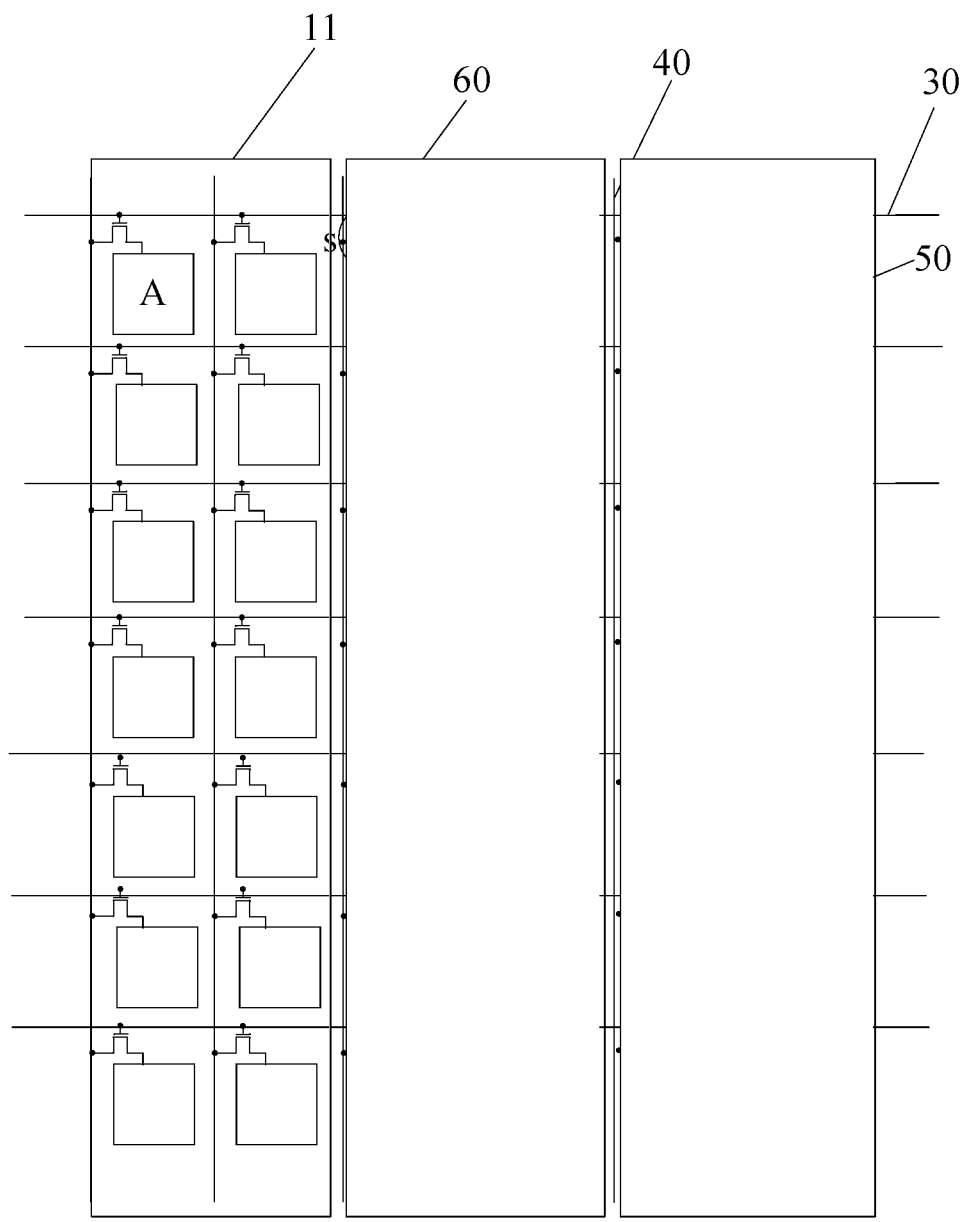
FIG. 8 illustrates a schematic view of another exemplary configuration of stripe-shaped sub-electrodes and sub-pixels, consistent with the disclosed embodiments.

In one embodiment, in the second direction, the width of a stripe-shaped sub-electrode 11 covers at least the width of two sub-pixels 50, wherein the width of a sub-pixel is the width of the light transmission area of the sub-pixel 50 in the second direction. FIG. 7 and FIG. 8 illustrate two exemplary configurations of stripe-shaped sub-electrodes and sub-pixels, wherein the width of a stripe-shaped sub-electrode 11 covers at least the width of two sub-pixels 50. In the configuration shown in FIG. 7, the width of a stripe-shaped sub-electrode 11 covers at least the width of two adjacent sub-pixels 50 and the width of the spacing region between the two adjacent sub-pixels 50. In the configuration shown in FIG. 8, the width of a stripe-shaped sub-electrode 11 covers at least the width of two sub-pixels, the width of the spacing region between the two sub-pixels 50, and a part of the width of the spacing region between these two sub-pixels 50 and other sub-pixels 50 in the second direction.

Figure 9:
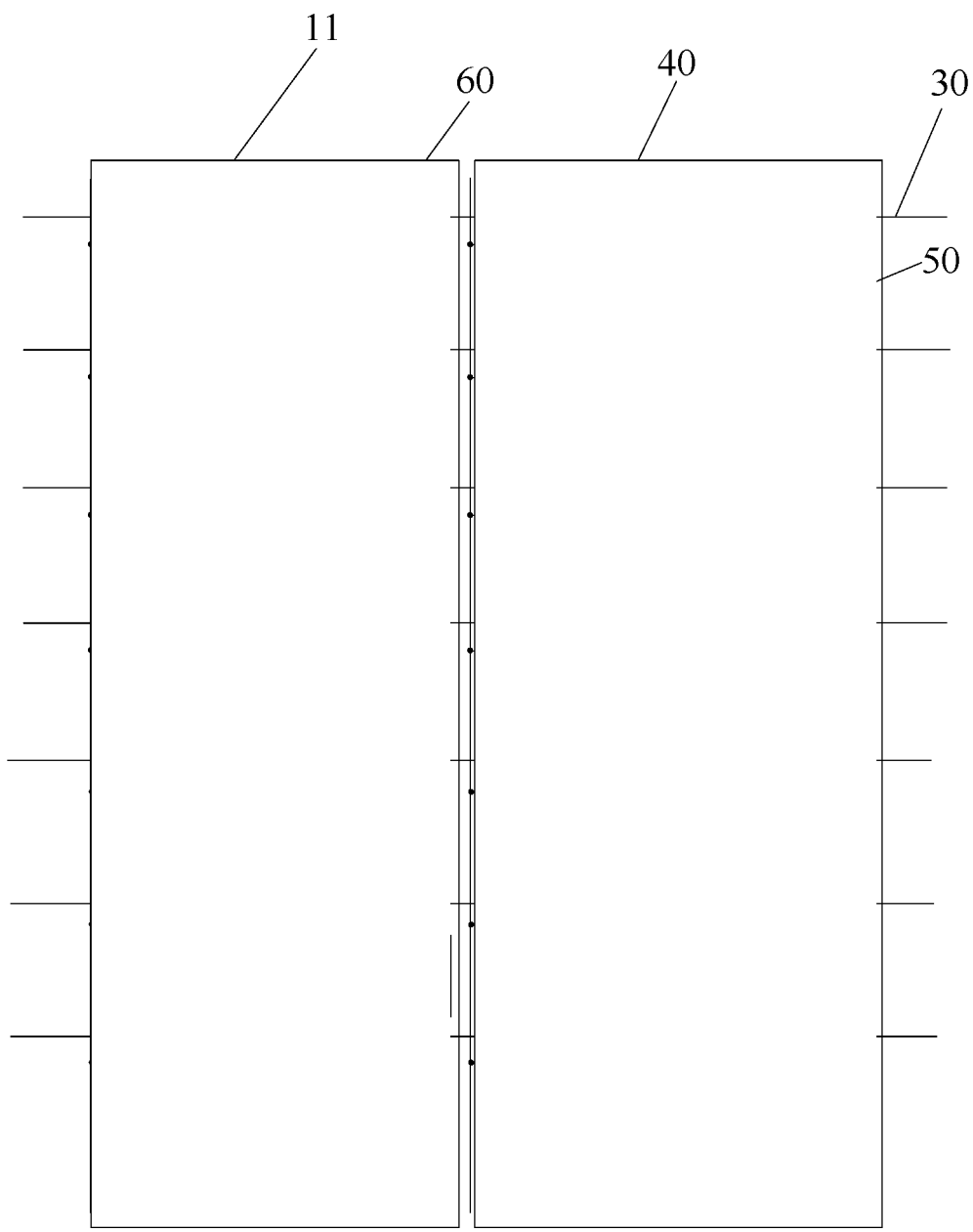
FIG. 9 illustrates a schematic view of another exemplary configuration of stripe-shaped sub-electrodes and sub-pixels, consistent with the disclosed embodiments.

FIG. 9 illustrates another configuration of stripe-shaped sub-electrodes and sub-pixels. As shown in FIG. 9, in the second direction, the width of a stripe-shaped sub-electrode 11 covers the width of three sub-pixels 50.

In some other embodiments, in the second direction, the width of a stripe-shaped sub-electrode 11 may cover the width of other numbers of sub-pixels 50. The present disclosure does not limit the number of sub-pixels that may be covered by a stripe-shaped sub-electrode. The number of sub-pixels that may be covered by a stripe-shaped sub-electrode may be determined according to actual applications.

Figure 10:
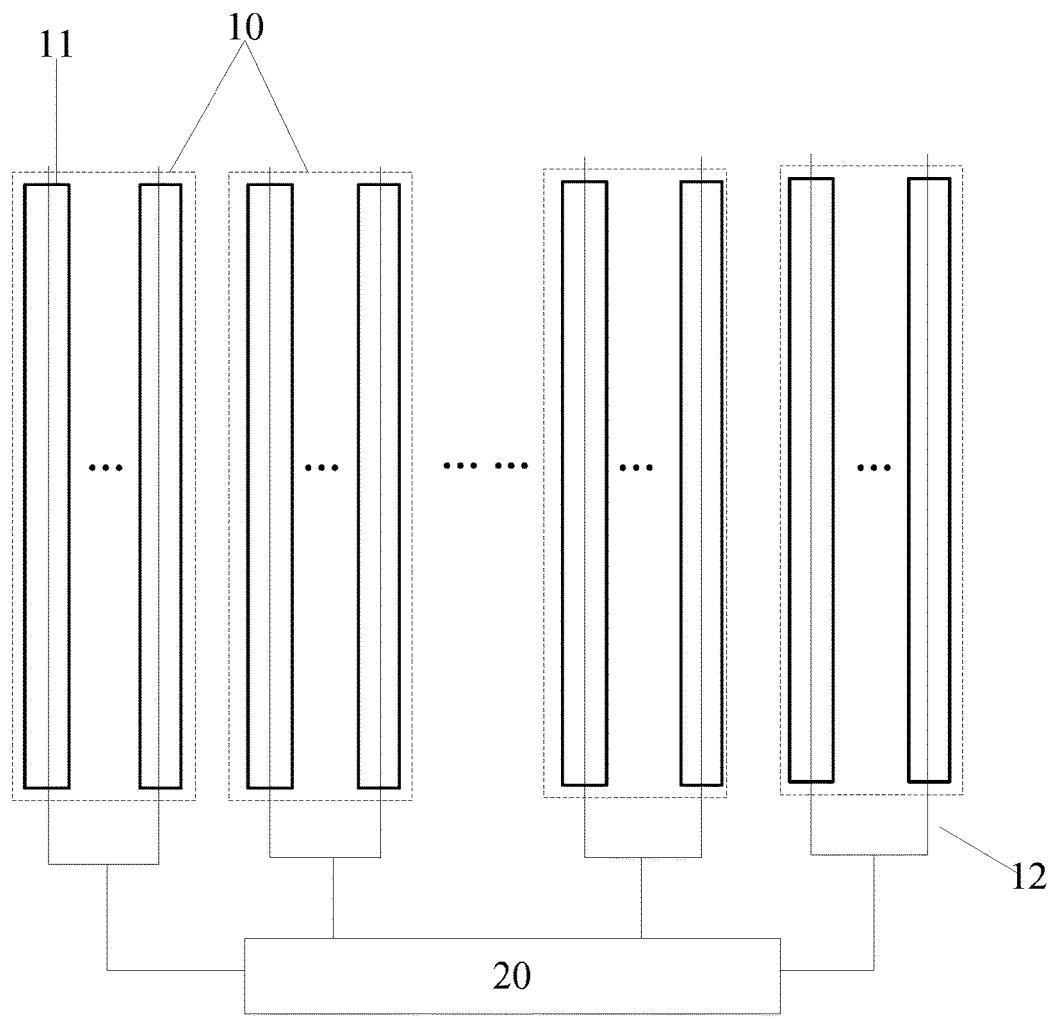
FIG. 10 illustrates a schematic view of an exemplary configuration of electrode leads for electrical connection of stripe-shaped sub-electrodes, consistent with the disclosed embodiments.

FIG. 10 illustrates an exemplary configuration of electrode leads for electrical connection of stripe-shaped sub-electrodes with a driving circuit 20. In the configuration shown in FIG. 10, each stripe-shaped sub-electrode 11 of striped electrodes 10 is electrically connected to at least one electrode lead 12, so that all the stripe-shaped sub-electrodes 11 may be connected to the driving circuit 20.

Figure 11:
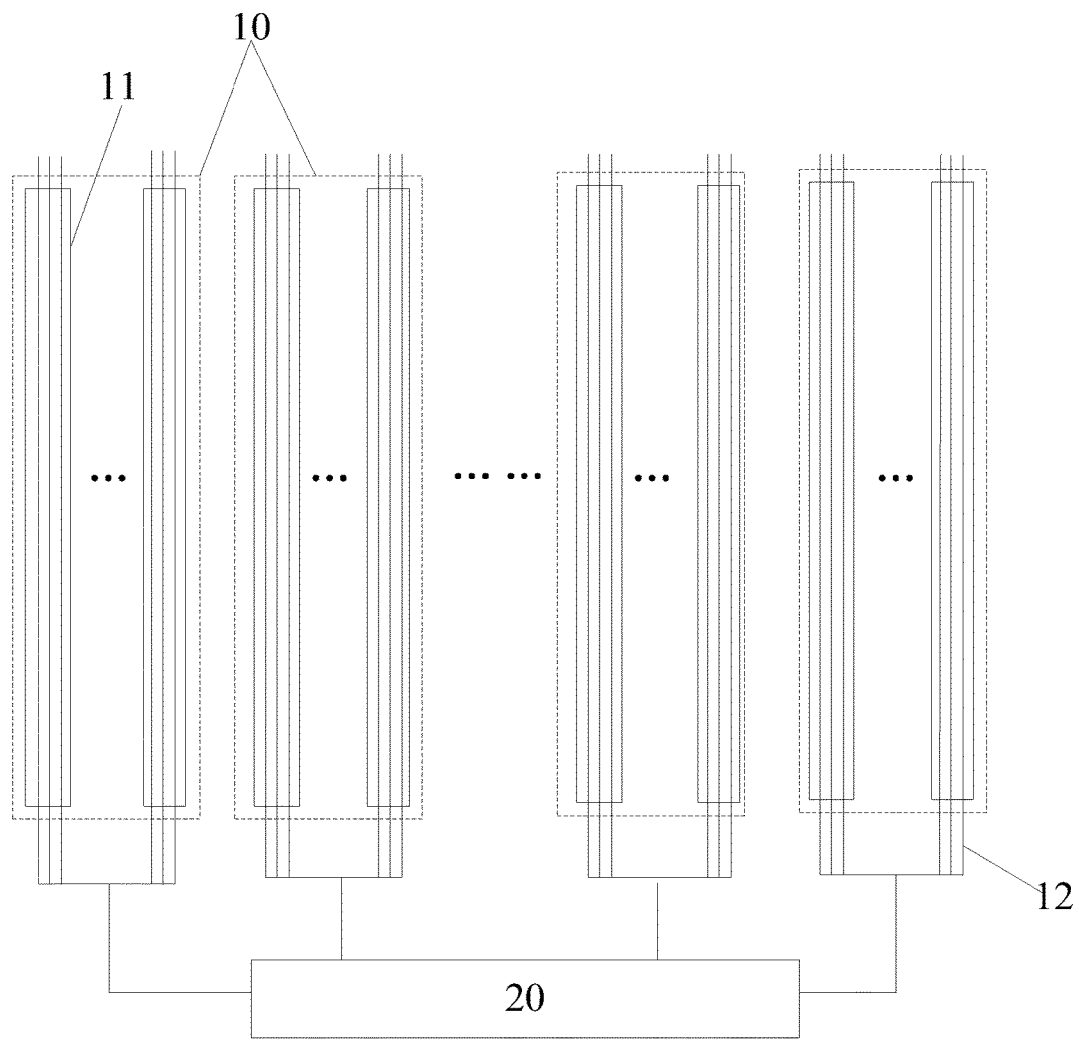
FIG. 11 illustrates a schematic view of another exemplary configuration of electrode leads for electrical connection of stripe-shaped sub-electrodes, consistent with the disclosed embodiments.

FIG. 11 illustrates another exemplary configuration of electrode leads for electrical connection of stripe-shaped sub-electrodes with a driving circuit 20. In the configuration shown in FIG. 11, each stripe-shaped sub-electrode 11 of stripe-shaped electrodes 10 is connected to a plurality of electrode leads 12. In this way, the overall electrical resistance of the lead electrodes for electrical connection of each stripe-shaped sub-electrode 11 of the stripe-shaped electrodes 10 may be decreased.

In the plurality of electrode leads 12 electrically connected to a stripe-shaped sub-electrode 11, the spacing between two adjacent electrode leads 12 is at least the width of a sub-pixel 50. In this way, the plurality of electrode leads 12 electrically connected to a stripe-shaped sub-electrode 11 of a strip electrode 10 may be located at the non-light-transmission regions between adjacent sub-pixels 50. Therefore the light transmission areas of the sub-pixels may be not affected by electrode leads 12, and the aperture ratio of the touch-control display panel may thus be ensured.

In another embodiment, each stripe-shaped sub-electrode 11 is electrically connected to a plurality of electrode leads 12, and the plurality of electrode leads 12 electrically connected to each stripe-shaped sub-electrode 11 are uniformly distributed. That is, the distances between two random adjacent electrode leads 11 that are electrically connected to a sub-strip shape electrode 12 are equal. Therefore, the slits in a touch-control display panel may have a uniform distribution, and thus the visible slit effect due to the slits in the touch-control display panel may be further homogenized. In this way, the visible slit phenomenon of the touch-control display panel may be alleviated, and so the display quality of the touch-control display panel may be improved.

In another embodiment, the electrode leads 12 electrically connected to different stripe-shaped electrodes 10 are uniformly distributed, making the distribution of the slits in the touch-control display panel more uniform. In this way, the visible slit effect due to the presence of slits in the touch-control display panel may become more uniform, relieving the visible slit phenomenon of the touch-control display panel, and thus the display quality of the touch-control display panel may be improved.

In another embodiment, the touch-control display panel is a self-capacitance touch-control display panel. In a touch-control stage, the stripe-shaped electrodes 10 work as self-capacitance touch-control electrodes.

Figure 12:
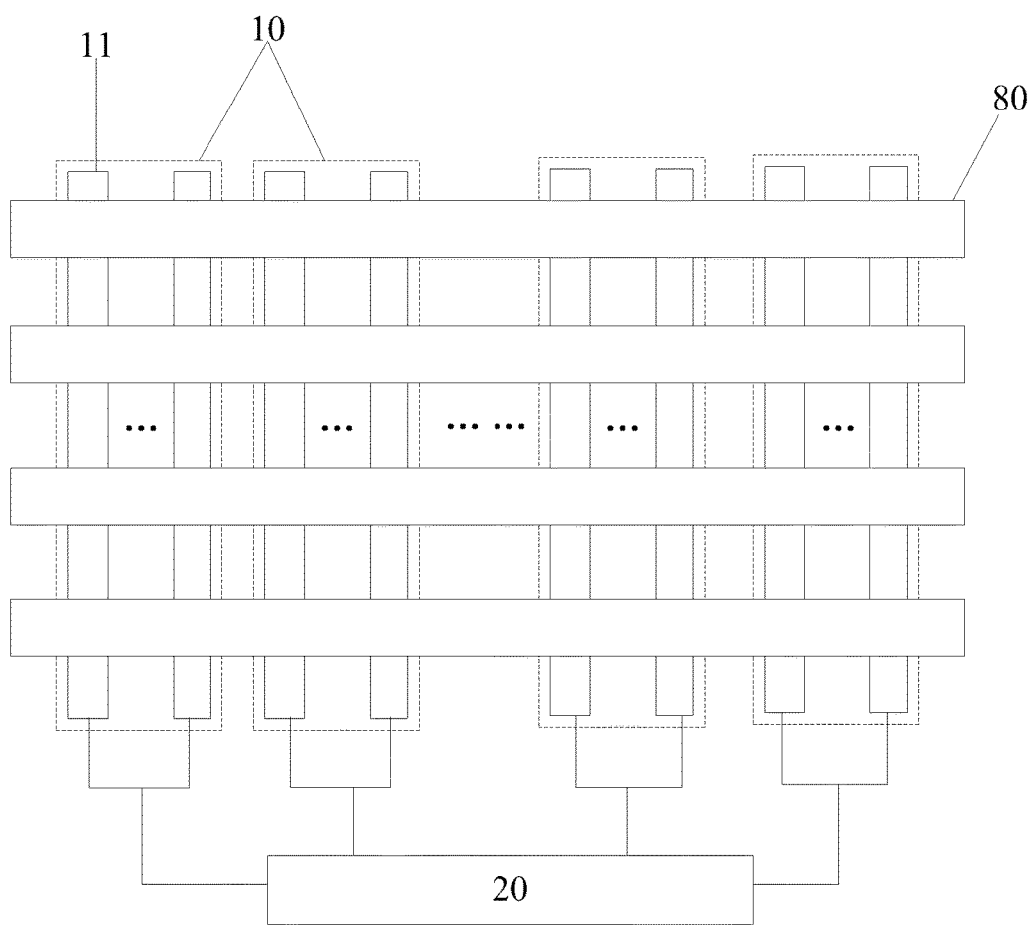
FIG. 12 illustrates an exemplary structure of touch-control electrodes and a driving circuit, consistent with the disclosed embodiments.

In another embodiment, the touch-control display panel is a mutual capacitance touch-control display panel. In a touch-control stage, the stripe-shaped electrodes 10 work as driving electrodes for the mutual-capacitance touch-control electrodes. Further, as shown in FIG. 12, the touch-control display panel also comprises a plurality of sensing electrodes 80 arranged in parallel in the second direction. The sensing electrodes 80 and the driving electrodes 10 together form a touch-control electrode. The angle between the first direction and the second direction may be configured with any appropriate value.

In operation, the driving circuit 20 respectively provides a scanning signal to each stripe-shaped electrode 10. The driving circuit 20 simultaneously provides a same scanning signal to different stripe-shaped sub-electrodes 11 of a same stripe-shaped electrode 10. When the driving circuit provides a scanning signal to each stripe-shaped electrode, the driving circuit concurrently detects the sensing signal of each sensing electrode 80, for realizing touch-control detection. In the process of scanning each stripe-shaped electrode 10, if a touch occurs at the surface of the touch-control display panel, a sensing signal may be detected at the location of a sensing electrode 80. If no touch occurs at the surface of the touch-control display panel, no sensing signal may be detected at the location of a sensing electrode 80.

For a mutual capacitance touch-control display panel, the first direction and the second direction may be set to be perpendicular to each other. The present invention does not limit the angle between the first direction and the second direction. It is within the protection scope of the present application as long as each of the plurality of driving electrodes intersects with each of the sensing electrodes, and each of the plurality of the sensing electrodes intersects with each driving electrode. In the configuration shown in FIG. 12, the driving electrodes are stripe-shaped electrodes 10.

The electrodes may be made of any appropriate transparent conductive material, such as indium tin oxide (ITO). The material for the electrode leads, the scanning lines and the data lines may be a metal, an alloy, or a transparent conductive material, such as indium tin oxide (ITO).

Thus, the disclosed touch-control display panel may include a display electrode layer and an oppositely disposed common electrode layer, and a driving circuit 20. The common electrode layer comprises a plurality of stripe-shaped electrodes 10 disposed in parallel in the first direction. In a display stage, the stripe-shaped electrodes 10 operate as common electrodes, and the driving circuit 20 provides a common voltage signal to the stripe-shaped electrodes 10. In a touch-control stage, the stripe-shaped electrodes 10 operate as touch-control electrodes, and the driving circuit 20 provides a touch-control driving signal to the stripe-shaped electrodes 10. At least one of the plurality of stripe-shaped electrodes 10 comprises at least two stripe-shaped sub-electrodes arranged in parallel in the first direction, increasing the number of slits in the touch-control display panel. In this way, the visible slit effect due to the slits in the touch-control display panel may be homogenized, and the visible slit phenomenon of the touch-control display panel may be relieved, and thus the display quality of the touch-control display panel may be improved.

The embodiments disclosed herein are exemplary only and not limiting the scope of this disclosure. Various combinations, alternations, modifications, or equivalents to the technical solutions of the disclosed embodiments can be obvious to those skilled in the art and can be included in this disclosure. Without departing from the spirit and scope of this invention, such other modifications, equivalents, or improvements to the disclosed embodiments are intended to be encompassed within the scope of the present disclosure.

What is claimed is:

1. A touch-control display panel, comprising:
a common electrode layer having a plurality of stripe-shaped electrodes disposed in parallel, wherein the plurality of stripe-shaped electrodes are arranged in a second direction and extending in a first direction, at least one of the plurality of stripe-shaped electrodes includes at least two stripe-shaped sub-electrodes arranged in parallel and arranged in the second direction, and the first direction intersects the second direction;
a display electrode layer disposed opposite to the common electrode layer; a driving circuit for driving the plurality of stripe-shaped electrodes; and a plurality of scanning lines and a plurality of data lines defining a plurality of subpixels arranged in a matrix, wherein:
in the second direction, a width of each of the at least two stripe-shaped sub-electrodes in the common electrode layer covers a width of at least two sub-pixels;
in a display stage, the plurality of stripe-shaped electrodes operate as common electrodes, and the driving circuit provides common voltage signals to the stripe-shaped electrodes; and
in a touch-control stage, the plurality of stripe-shaped electrodes operate as touch-control electrodes, and the driving circuit concurrently provides a same touch-control driving signals to the stripe shaped electrodes all the stripe-shaped sub-electrodes of each stripe-shaped electrode;
wherein each stripe-shaped sub-electrode of the stripe-shaped electrodes is connected to the driving circuit through a plurality of electrode leads, and a spacing between two adjacent electrode leads is at least a width of a sub-pixel.

2. The touch-control display panel according to claim 1, wherein each of the plurality of stripe-shaped electrodes comprises at least two stripe-shaped sub-electrodes arranged in parallel and arranged in the second direction.

3. The touch-control display panel according to claim 2, wherein each of the plurality of stripe-shaped electrodes comprises three stripe-shaped sub-electrodes arranged in parallel and arranged in the second direction.

4. The touch-control display panel according claim 1, wherein, for each stripe-shaped electrode, all the stripe-shaped sub-electrodes are electrically connected each other, and then electrically connected to the driving circuit through an electrode lead.

5. The touch-control display panel according to claim 4, wherein, for each stripe-shaped electrode, all the stripe-shaped sub-electrodes are electrically connected with each other through an electrode lead and then electrically connected to the driving circuit.

6. The touch-control display panel according to claim 1, wherein:
the scanning lines and the data lines are electrically connected to the display electrode layer, and
the scanning lines and the data lines define the plurality of sub-pixels arranged in the matrix, with a spacing region between two adjacent sub-pixels.

7. The touch-control display panel according to claim 1, wherein, in the second direction, the width of each of the at least two stripe-shaped sub-electrodes covers the width of three sub-pixels.

8. The touch-control display panel according to claim 6, wherein each stripe-shaped sub-electrode of the stripe-shaped electrodes is electrically connected to the driving circuit through at least one electrode lead.

9. The touch-control display panel according to claim 8, wherein the plurality of electrode leads electrically connected to each stripe-shaped sub-electrode are uniformly distributed.

10. The touch-control display panel according to claim 1, wherein the electrode leads electrically connected to different stripe-shaped electrodes are uniformly distributed.

11. The touch-control display panel according to claim 10, wherein the stripe-shaped electrodes work as driving electrodes of mutual-capacitance touch-control electrodes in the touch-control stage, and the driving circuit simultaneously provides a same scanning signal to different stripe-shaped sub-electrodes of a same stripe-shaped electrode.

12. The touch-control display panel according to claim 11, further comprising:
a plurality of sensing electrodes arranged in parallel and arranged in the first direction.

* * * * *